United States Patent
Brooks et al.

(10) Patent No.: US 10,744,919 B2
(45) Date of Patent: Aug. 18, 2020

(54) OPERATOR SEAT SYSTEM WITH AN ARMREST CONTROL CENTER FOR INTEGRATED CONTROL OF AGRICULTURAL MACHINE FUNCTIONS

(71) Applicant: CNH Industrial America LLC, New Holland, PA (US)

(72) Inventors: Nathan P. Brooks, Manitowoc, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 98 days.

(21) Appl. No.: 15/820,812

(22) Filed: Nov. 22, 2017

(65) Prior Publication Data

US 2019/0152360 A1 May 23, 2019

(51) Int. Cl.
| | |
|---|---|
| *B60N 2/38* | (2006.01) |
| *B60N 2/02* | (2006.01) |
| *G05G 1/62* | (2008.04) |
| *B60N 2/75* | (2018.01) |
| *B60N 2/16* | (2006.01) |
| *B60N 2/22* | (2006.01) |
| *B60N 2/12* | (2006.01) |
| *B60N 2/14* | (2006.01) |

(Continued)

(52) U.S. Cl.
CPC ............... *B60N 2/797* (2018.02); *B60N 2/02* (2013.01); *B60N 2/12* (2013.01); *B60N 2/14* (2013.01); *B60N 2/1665* (2013.01); *B60N 2/22* (2013.01); *B60N 2/38* (2013.01); *B60N 2/525* (2013.01); *B60N 2/77* (2018.02); *B60N 2/773* (2018.02); *B62D 49/0692* (2013.01); *G05G 1/62* (2013.01); *A01C 23/00* (2013.01); *A01M 7/006* (2013.01); *A01M 7/0042* (2013.01); *A01M 7/0082* (2013.01); *A01M 7/0089* (2013.01); *A01M 21/043* (2013.01); *B60R 2011/0014* (2013.01)

(58) Field of Classification Search
CPC .......... B60N 2/797; B60N 2/525; B60N 2/14; B60N 2/12; B60N 2/22; B60N 2/38; B60N 2/763; B60N 2/767; B60N 2/77; B60N 2/773; B60N 2/777; B60N 2/79; B60N 2/46; B60N 2/02; A01M 7/0042; G05G 1/62; B60R 2011/0014
USPC ........................ 180/315, 334, 326, 329, 333; 297/411.32, 115, 116, 411.35, 411.36, 297/411.37, 411.38, 411.2; 56/323; D12/421
See application file for complete search history.

(56) References Cited

U.S. PATENT DOCUMENTS

| | | |
|---|---|---|
| 4,176,878 A | 12/1979 | Koutsky |
| 4,646,869 A | 3/1987 | Kerner, Jr. |

(Continued)

OTHER PUBLICATIONS

Ergonomic Cab Design; Komatsu Mobile Walkaround; PC170LC-10; one page.

*Primary Examiner* — Keith J Frisby
(74) *Attorney, Agent, or Firm* — Rebecca L. Henkel; Rickard K. DeMille

(57) ABSTRACT

An operator seat system is provided that includes an operator seat and an armrest control center with an I/O (input/output) system that is connected to and moves with the operator seat. An armrest control center mount system may include a seat mount and an armrest control center mount that are attached to each other with an adjustment system that allows adjustment of the armrest control center with respect to the operator seat.

5 Claims, 6 Drawing Sheets

(51) Int. Cl.
*B60N 2/52* (2006.01)
*B62D 49/06* (2006.01)
A01C 23/00 (2006.01)
A01M 21/04 (2006.01)
A01M 7/00 (2006.01)
B60R 11/00 (2006.01)

(56) References Cited

U.S. PATENT DOCUMENTS

| | | |
|---|---|---|
| 4,664,221 A | 5/1987 | Loney et al. |
| 5,086,869 A | 2/1992 | Newberry et al. |
| 5,177,616 A | 1/1993 | Riday |
| 5,924,515 A * | 7/1999 | Stauffer .................. B60N 2/38 |
| | | 180/326 |
| 6,039,141 A | 3/2000 | Denny |
| 6,276,749 B1 | 8/2001 | Okazawa et al. |
| 6,450,284 B1 | 9/2002 | Sakyo et al. |
| 6,564,896 B1 | 5/2003 | Proksch et al. |
| 7,121,608 B2 | 10/2006 | Billger et al. |
| 7,520,567 B2 | 4/2009 | Billger et al. |
| 8,226,155 B2 | 7/2012 | Hill et al. |
| 8,388,262 B2 | 3/2013 | Klein et al. |
| 9,057,221 B2 | 6/2015 | Denny |
| 9,707,865 B1 * | 7/2017 | Buerkle .................. B60N 2/14 |
| 2007/0073464 A1 * | 3/2007 | Chen ...................... B60N 2/753 |
| | | 701/49 |
| 2008/0197682 A1 | 8/2008 | Kim |
| 2013/0110357 A1 * | 5/2013 | Peterson ............. A01M 7/0089 |
| | | 701/50 |
| 2017/0158102 A1 * | 6/2017 | Murray .................. B60N 2/501 |

* cited by examiner

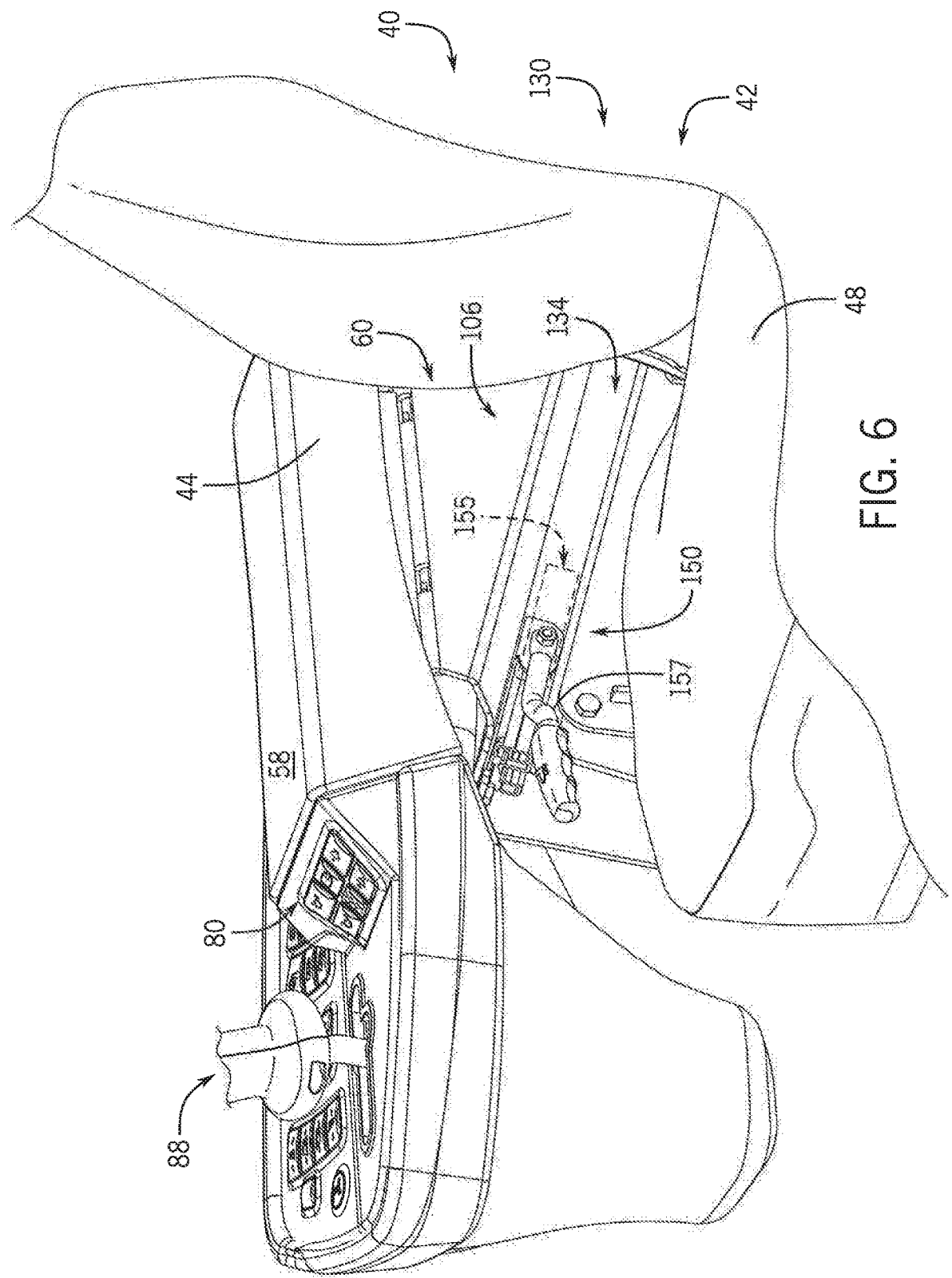

OPERATOR SEAT SYSTEM WITH AN ARMREST CONTROL CENTER FOR INTEGRATED CONTROL OF AGRICULTURAL MACHINE FUNCTIONS

FIELD OF THE INVENTION

The invention relates generally to agricultural machines including agricultural product application equipment such as self-propelled sprayers and, in particular, to an operator seat system that has an armrest control center for integrated control of the agricultural machine functions that is adjustable with the operator seat.

BACKGROUND OF THE INVENTION

Agricultural machines are getting more complex and require more operator controls to control their various operational systems or functional groups. As one example, high-clearance sprayers are getting larger and more complex to allow for increasing coverage in a single pass, which improves application efficiency. Sprayers have multiple functions and capabilities which must be managed by an operator in the cab. Main functions include propel, steering, and product application. Each of these main functions typically has numerous aspects or additional functions that can be controlled by the operator. These include travel speed, heading, boom functions, and product application characteristics. Although it is important to monitor and adjust the states of these functions, it can be difficult to do this while focusing on the primary driving tasks, which require operator concentration on the field. But it can be challenging at times during use for an operator to quickly glance at gauges or other displays and/or quickly locate controls. That is because the controls and displays are typically fix-mounted within the cab while the operator typically sits in a suspension seat that purposefully can move relative to the cab to absorb shocks or other loads transferred through the cab. Depending on the terrain and travel speeds, this can lead to the operator randomly moving with respect to the controls and displays.

SUMMARY OF THE INVENTION

According to one aspect of the invention, an operator seat system with an armrest control center for integrated control of agricultural machine functions is provided. Essential functions for controlling the agricultural machine are moved to a control center with I/O (input/output) features or devices through the armrest of the operator seat as an armrest control center. The armrest control center is connected to and moves with the seat so that the I/O devices remain close to the operator's hand and remain easily within sight.

According to another aspect of the invention, the armrest control center is attached to and moves in unison with an operator's seat that is configured to rotate, tilt, adjust up/down, and move up and down to damp shocks and other loads as a suspension seat. The armrest control center includes an I/O system with various I/O devices that may be connected to, for example, a CAN bus for affecting various controls over the machine, such as opening valves, activating product and/or rinse pumps, controlling boom fold, and so forth, by the operator's hand. The I/O system also includes a joystick mounted to the armrest for controlling aspects, including activation of spray sections. A Virtual Terminal (VT), or field computer or other monitor(s), may also be mounted to the armrest control center for monitoring and/or adjusting the state of various functions of the machine through a CAN bus, such as boom height. Since the armrest control center moves in unison with the operator's seat, once positions of the I/O devices are adjusted with respect to the seat, they are maintained in a constant position with respect to the operator even when the operator moves as the suspension seat moves to accommodate uneven terrain. The position of the armrest control center can be adjusted with respect to the seat; for example, repositioned and fixed longitudinally and vertically.

According to one aspect of the invention, an operator seat system with an armrest control center for integrated control of agricultural machine functions is provided. The operator seat system includes an operator seat mounted in an operator cab of an agricultural machine. The operator seat may be a suspension seat with a seat suspension system that connects the seat to the operator cab floor and is configured to isolate the operator seat from the floor. This allows the relative movements between the operator seat and the operator cab to, for example, damp or reduce transmission of shock loads or various other movements through the floor of the operator cab into the seat. The armrest control center is movably mounted to the seat for adjusting and selectively fixing a relative position of the armrest control center with respect to the seat. The armrest control center defines a locked state in which the armrest control center is fixed with respect to the seat and an unlocked state in which the armrest control center can move with respect to the seat for adjusting its positions. A console is arranged at the armrest control center and includes an I/O (input/output) system that is configured to control multiple functional systems of the agricultural machine. When the armrest control center is in its locked state, the I/O system is maintained in a constant position with respect to and moves in unison with the seat to keep a constant distance and relationship between the operator and the I/O system, even during, for example, seat suspension movements or seat position adjustment movements.

According to another aspect of the invention, the seat includes a seat base that may attach to the seat suspension system and includes a lower seat cushion. A seat backrest includes a backrest cushion and is pivotally attached to the seat base. An armrest control center mount system connects the armrest control center to the seat base. The mount system prevents movement of the armrest control center when it is in the locked state and guides movement of the armrest control center when it is in the unlocked state.

According to another aspect of the invention, the armrest control center mount system includes a seat mount that is fixed with respect to the seat base and an armrest control center mount that is fixed with respect to the armrest control center. A track arrangement may include a track(s) that is arranged for guiding relative movement between the seat mount and the armrest control center mount when the armrest control center is in the unlocked state. The track arrangement may include an upper track arranged between overlapping upper segments of the seat mount and the armrest control center mount and a lower track arranged between overlapping lower segments of the seat mount and the armrest control center mount. The upper and lower tracks may be arranged perpendicularly with respect to each other. The upper track may be arranged between generally horizontal segments of the armrest control center mount and the seat mount. The lower track may be arranged between generally vertical segments of the armrest control center mount and the seat mount.

According to another aspect of the invention, the agricultural machine is a self propelled agricultural sprayer. The cab defines a cab entry side with a cab door for entering and exiting the cab. The seat defines a seat entry side arranged toward the cab entry side and faces the cab door. The armrest control center is arranged at a control side of the seat, which is opposite the cab entry side. An entry side armrest, which may be a left hand armrest, is configured to selectively move for facilitating entry and exit from the operator seat, for example, by pivoting up from the seat backrest. The armrest control center may be configured to move to adjust a longitudinal position and/or a vertical position of the armrest control center. The armrest control center may be configured to move for simultaneously adjusting the longitudinal and vertical positions of the armrest control center.

According to another aspect of the invention, a track arrangement between the armrest control center and the operator seat is provided that allows for simultaneously adjusting longitudinal or fore/aft position and height of the armrest control center. The track arrangement may extend angularly upward from its back end to its front end. Moving the armrest control center in a forward or fore direction longitudinally advances the armrest control center and simultaneously vertically raises the armrest control center. Moving the armrest control center in a rearward or aft direction longitudinally regresses the armrest control center and simultaneously vertically lowers the armrest control center.

According to another aspect of the invention, the agricultural machine may be a self-propelled agricultural sprayer with a sprayer boom and the I/O system may include at least two sets of I/O devices for controlling at least two functional groups of the agricultural sprayer, which may include at least two of: (i) a boom control functional group for controlling movement of the sprayer boom; (ii) a spray system functional group for controlling components that are configured for delivering liquid products from the sprayer boom; (iii) an engine control system functional group for controlling operating characteristics of the agricultural sprayer's engine; (iv) a radio control system functional group for controlling the agricultural sprayer's radio; and (v) a drive control system functional group for controlling components that are configured for propelling the agricultural sprayer.

According to another aspect of the invention, the armrest control center includes an armrest pad that may be arranged at a greater height and closer to the operator seat than some of the sets of I/O devices of the main side console. An armrest pad fingertip console extends angularly down from and forward with respect to a front segment of the armrest pad. Another set of I/O devices is arranged at the armrest fingertip console for controlling a different one of the functional groups.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 6 is a side elevation view of a lock mechanism of the armrest control center of FIG. 2.

DETAILED DESCRIPTION OF THE PREFERRED EMBODIMENTS

Figure 1:
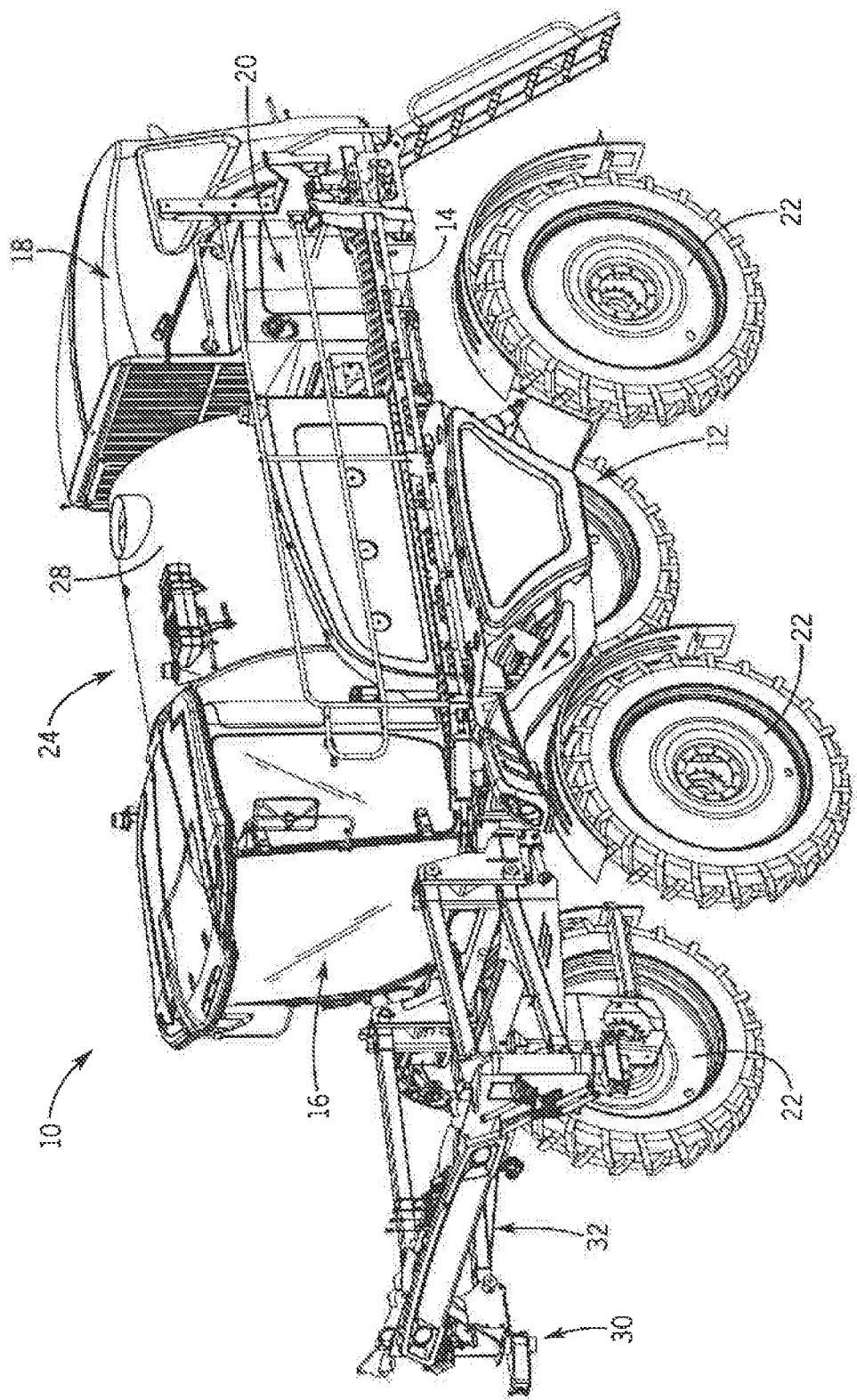
FIG. 1 is an isometric view of an agricultural machine incorporating an operator seat system with an armrest control center in accordance with the present invention.

Referring nor to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller. Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16 that defines a cab entry side, shown here as the left side of sprayer 10 with a cab door for entering and exiting the cab. Engine 18 and a hydraulic system 20 are shown toward the back of sprayer 10. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is attached to a boom center section and is configured to move the boom 30 up and down for adjusting the height of application of the product. Boom 30 has multiple interconnected boom segments that extend in opposite directions from the boom center section and are configured along with corresponding actuators to allow the boom to fold into a transport position or extend out into it as an in-use or spray position.

Figure 2:
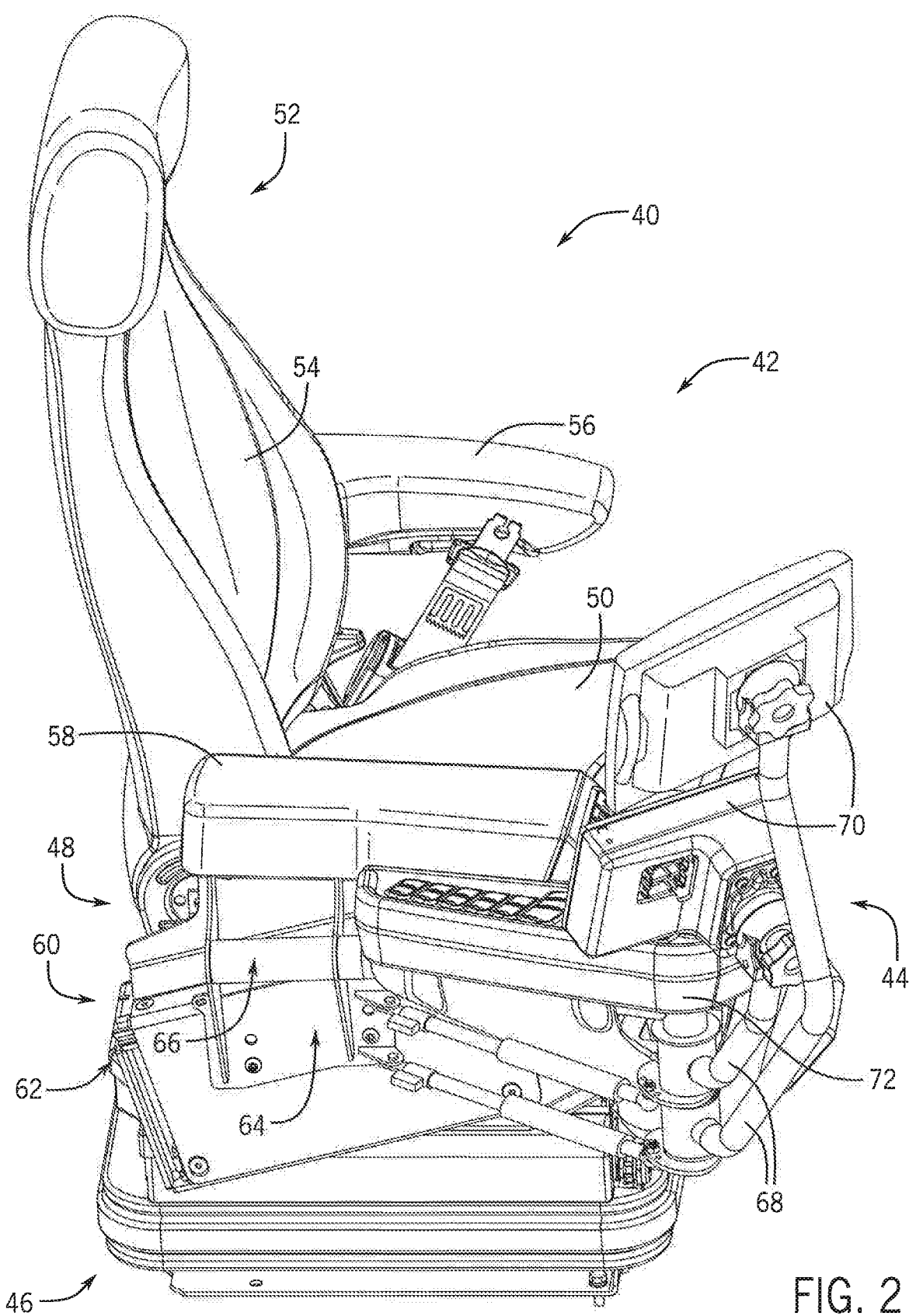
FIG. 2 is an isometric view of an operator seat system with an armrest control center in accordance with the present invention.

Referring now to FIG. 2, in the operator cab 16 (FIG. 1), an operator seat system 40 is supported on the floor of the cab 16 and includes an operator seat 42 and armrest control center 44. Operator seat 42 is shown here as a suspension seat with seat suspension system 46 that is a suspension seat that can move with respect to the cab 16 (FIG. 1) to absorb shocks or other loads transferred through the cab 16 (FIG. 1) to isolate the operator seat 42 from the cab floor. Seat suspension system 46 may include a damper that can be varied to suit different driving conditions and may have height and weight adjustments, such as a pneumatically adjustable air bag that can inflate and deflate to raise and lower the operator seat 42 and stiffen or soften the suspension. The seat suspension system 46 may have various other locks and adjustments that provide adjustment of various shock or other load-absorbing features, for example, fore/aft isolation, or lateral/horizontal isolation of operator seat 42. Seat suspension system 46 supports a seat base 48 that has a lower seat cushion 50 and a seat backrest 52 that is pivotally attached to the seat base 48 and has a backrest cushion 54. Operator seat 42 may also have various non-suspension adjustment or setting mechanisms, which may allow adjusting positions and orientations of the seat base 48 and/or seat backrest 52, such as fore/aft adjustment, backrest angle, seat depth adjustment, and seat pan angle adjustment. Regardless of the particular seat adjustments, armrest control center 44 is configured to maintain a constant position with respect to and move in unison with the operator seat 42, such as seat base 48. In this way, the armrest control center 44 is adjustable with the operator seat 42 so that adjustments to the operator seat 42 correspondingly move the armrest control center 44 to maintain the relative position of the armrest control center 44 with the operator seat 42, such as with respect to the seat base 48. The armrest control center 44 may be movably mounted to the operator seat 42 for adjusting and selectively fixing a relative position of the armrest control center 44 with respect to the operator seat 42, as explained in greater detail elsewhere herein.

Still referring to FIG. 2, an entry side armrest, shown as left hand armrest 56, is arranged at the cab entry side of cab 16 (FIG. 1) and is configured to selectively move for facilitating entry and exit from the operator seat 42, such as by pivoting up from the seat backrest 52. The armrest control center 44 is arranged at a side opposite the left hand armrest 56 or at the non-entry side of cab 16 (FIG. 1), shown here as the right side of cab 16 (FIG. 1) and includes a non-entry side armrest such as a right hand armrest that provides a control center side armrest pad 58 at the armrest control center 44.

Figure 3:
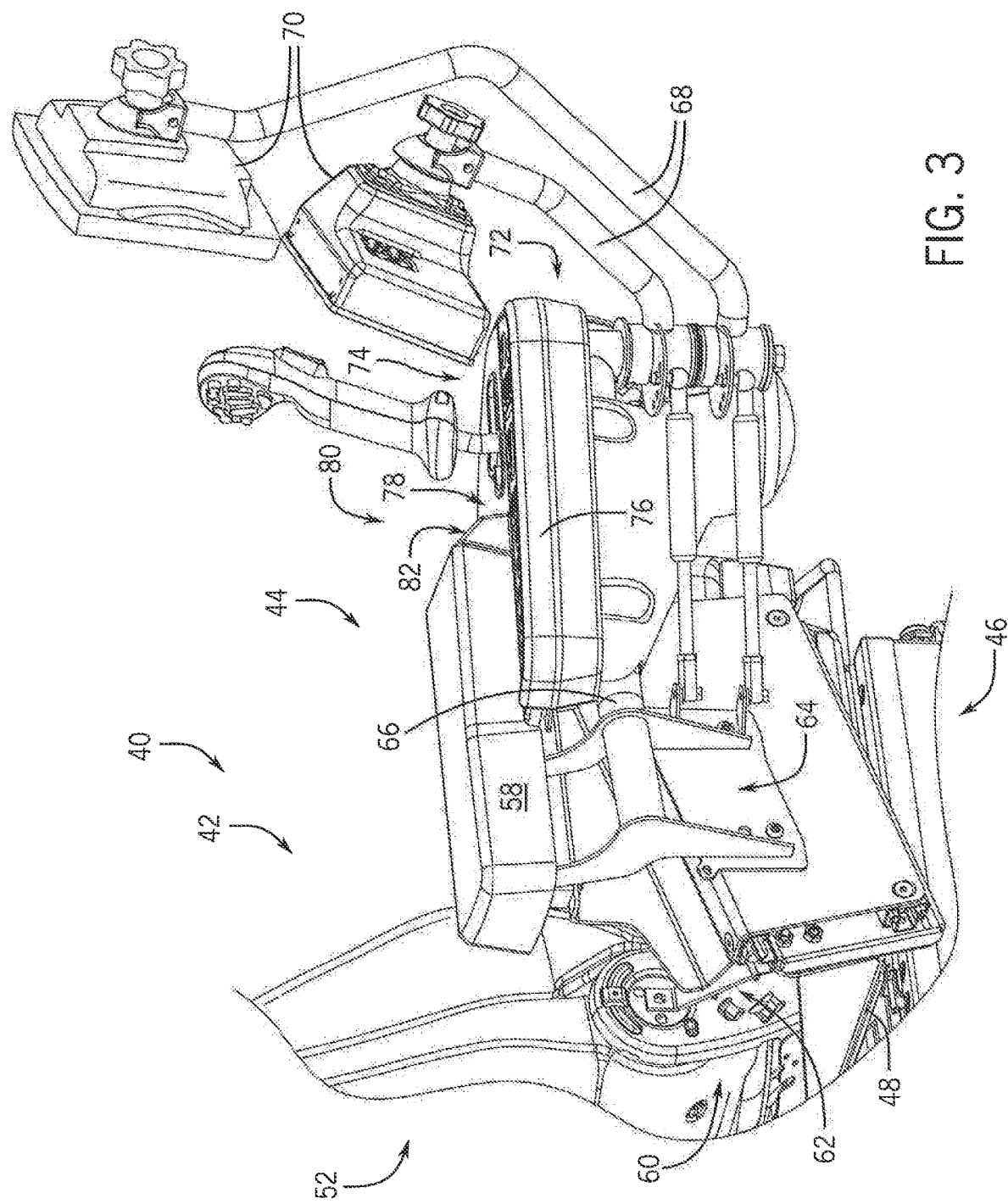
FIG. 3 is an isometric view of a portion of the armrest control center of FIG. 2.

Referring now to FIG. 3, armrest control center mount system 60 includes a mount arrangement 62 that provides a connecting interface between the operator seat 42 and the armrest control center 44. Mount arrangement 62 may be adjustable for changing relative positions of armrest control center 44 and seat 42, as described in greater detail elsewhere herein. Armrest pad support bracket 64 connects at its upper end to the armrest pad 58 and at its lower end to the mount arrangement 62. Support tube 66 extends generally horizontally from a back end of armrest pad support bracket 64 toward the front of the armrest control center 44. A front end of support tube 66 is shown supporting a pair of adjustable arms 68, each of which can support a monitor 70 which may be a touchscreen monitor as an HMI (human machine interface) and/or a VT (virtual terminal) or field computer. Arms 68 are shown here with stacked collars that are suspended from below the front end of support arm 66 that are configured to rotate about a common axis to adjust angular position of arms 68 and corresponding positions of the monitor(s) 70.

Still referring to FIG. 3, armrest control center 44 includes console 72 that is supported from below by forward and intermediate segments of the support tube 66 and in which an I/O (input/output) system 74 is arranged. The I/O system 74 is configured for controlling essential or commonly manipulated functions or features of the sprayer 10, such as boom position and movement control, wet system or spray system control, engine control, propel system control such as forward/reverse direction and travel speed control, and may include cab accessories controls such as radio controls. Console 72 is shown here with a main side console 76 that is arranged at a lower height than a top surface of armrest pad 58 and at least partially outwardly past the armrest pad 58, farther from operator seat 42. Main side console 76 is arranged generally horizontally with an upwardly facing top surface 78 that is parallel to the upper surface of armrest pad 58. Console 72 is shown here with an armrest pad fingertip console 80 that extends angularly down from and forward with respect to a front segment of the armrest pad 58. In this way, the fingertip console 80 presents a forward-facing angled surface 82 that extends between the top surface of armrest pad 58 and the main side console top surface 78.

Figure 4:
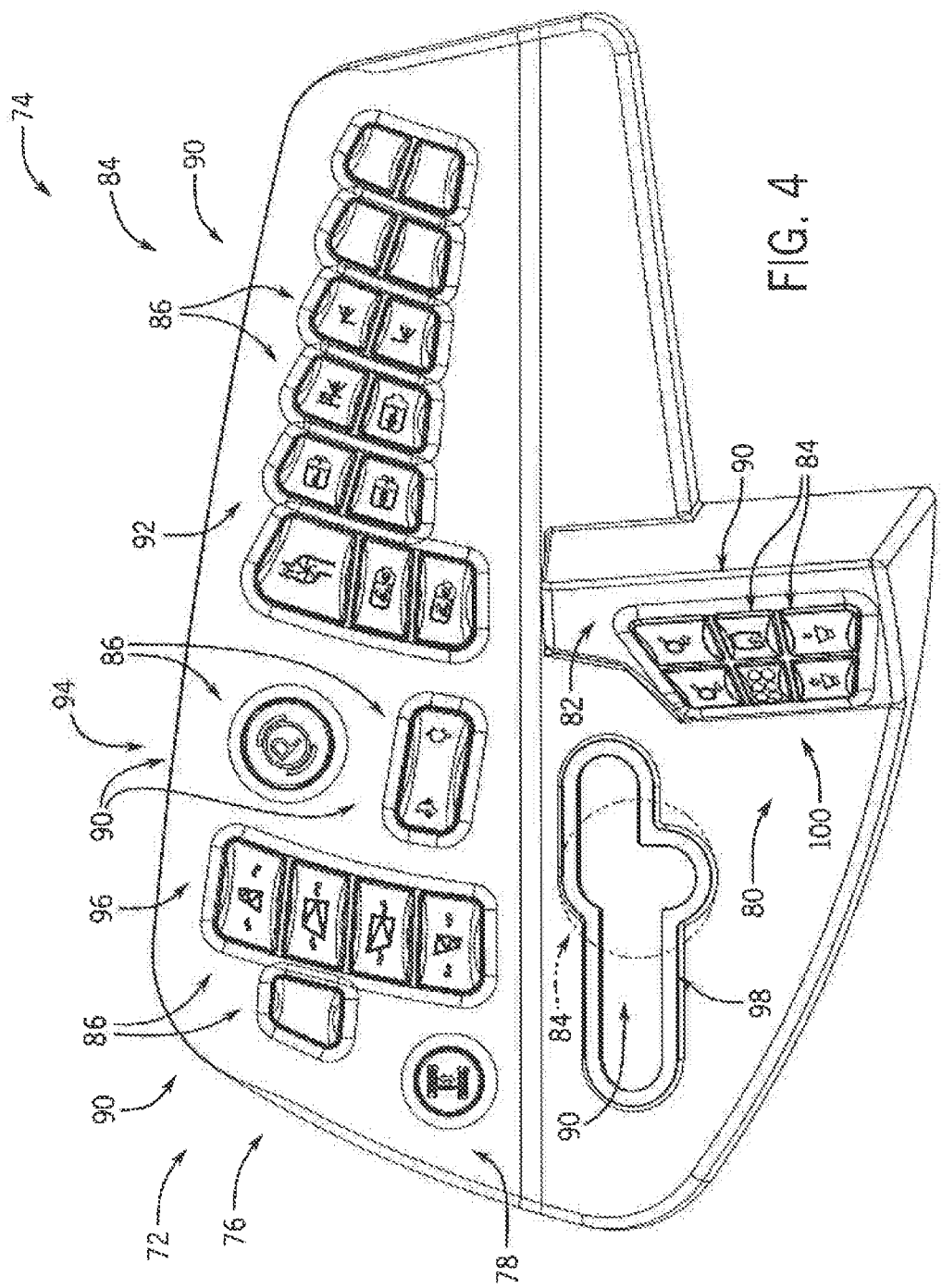
FIG. 4 is a top plan view of a console of the armrest control center of FIG. 2.

Referring now to FIG. 4, I/O system 74 includes various I/O devices 84 that may be connected to, for example, a CAN bus for affecting various controls of the sprayer 10. I/O devices 84 are shown here as, for example, various buttons or switches 86 and joystick 88 that, itself, has various buttons or switches for controlling various functions, such as over a CAN bus. The I/O devices 84 define sets 90 of I/O devices, each of which has at least one I/O device 84 that is arranged in a group according to which features, operational system(s), or functions group(s) they control.

Still referring to FIG. 4, a first set 90 of I/O devices is shown as a wet system or a spray system functional group 92 arranged toward a back right segment of the main side console 76 for controlling components that are configured for delivering liquid products from the sprayer boom. Spray system functional group 92 may include features such as, for example, sparge controls, product controls, product and the rinse sump controls, rinse sump and rinse nozzle controls, boom blowout controls, and left and right side fence row nozzle controls. Other I/O devices for controlling the wet or spray system may be arranged as I/O devices on the joystick 88, such as activating/deactivating various spray nozzles. A second set 90 of I/O devices is shown as an engine control system functional group 94 arranged in front of the spray system functional group 92. Engine control system functional group 94 is configured for controlling operating characteristics of the agricultural sprayer's engine 18 (FIG. 1), such as engine speed. A third set 90 of I/O devices is shown as a boom control functional group 96 that is arranged toward the front right segment of the main side console 76 for controlling movement of the sprayer boom. Boom control functional group 96 may include features such as, for example, left and right side primary boom swing in/out and left and right side secondary boom fold/unfold. A fourth set 90 of I/O devices is shown as a drive control system functional group 98 for controlling components that are configured for propelling the agricultural sprayer 10. The control system 98 is shown here defined by joystick 88, which is arranged toward a front left segment of the main side counsel 76 and can be pushed forward to propel the sprayer 10 in a forward direction or pulled backward to propel the sprayer 10 in a reverse direction. A fifth set 90 of I/O devices is shown as a radio control system functional group 100 arranged at the armrest pad fingertip console 80 for controlling the agricultural sprayer's radio. Radio control system functional group 100 may include features such as channel seek up/down, volume up/down, and channel presets. I/O system 74 may include other I/O devices, such as leg widening controls for adjusting track width and parking brake.

Figure 5:
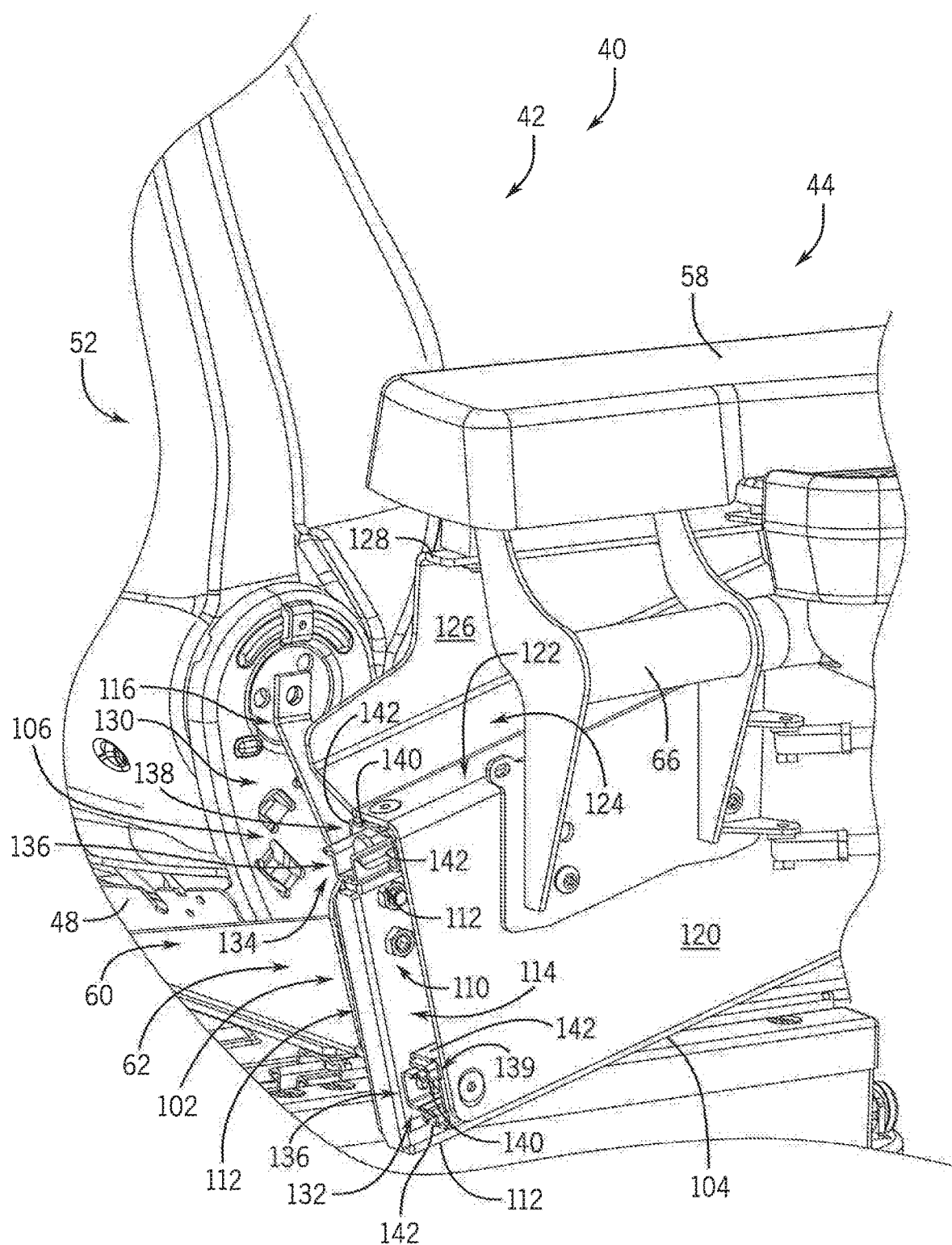
FIG. 5 is an enlarged isometric view of a portion of the armrest control center of FIG. 2.

Referring now to FIG. 5, regardless of the particular configuration of I/O system 74, armrest control center 44 maintains a constant desired position of the I/O devices mounted in it with respect to the operator seat 42 and an operator by allowing the I/O devices to remain close to the operator's hand and remain easily within sight. Mount arrangement 62 may be configured to allow for adjusting a position of armrest control center 44, such as adjusting a longitudinal position and/or a vertical position of the armrest control center 44. The armrest control center 44 may define a locked state in which it is fixed with respect to the operator seat 42 and an unlocked state in which it can move with respect to the operator seat 42 for adjusting the armrest control center 44 position(s). The locked and unlocked states of the armrest control center 44 may correspond to locked and unlocked states of the armrest control center mount system 60 or its mount arrangement 62. Mount arrangement 62 is shown having a seat mount 102 that is supported by the seat base 48, armrest control center mount 104, and an adjustment system 106 that connects and allows positional adjustment between the seat 102 and armrest control center mount 104.

Still referring to FIG. 5, seat mount 102 is shown here with an open-box configuration having a vertical side wall 110 that faces toward the operator seat 42 and an open opposite or open outer side and faces away from the operator seat 42, Seat mount 102 defines a generally rectangle perimeter shape that extends upwardly at an angle with respect to the cab floor. Top, bottom, and end walls are defined by flanges 112 that are full and outwardly away from the vertical side wall 110 and collectively extend about a seat mount void space 114. Seat mount hanger bracket 116 is shown extending angularly from seat mount 102 toward a pivot joint that connects the seat base 48 to the seat backrest 52. Armrest control center mount 104 overlaps the top and the open outer side of seat mount 102. Armrest control center mount 104 has a lower wall segment 120 that defines a generally rectangle perimeter shape that extends upwardly at an angle with respect to the cab floor, parallel to the vertical side wall 110 of seat mount 102 and covering a respective portion of the seat mount void space 114. Shelf 122 extends inwardly from the top portion of lower wall segment 120 toward seat 42, so that they collectively define an upside down L-shaped profile. Shelf 122 extends over the top of flange 112 of seat mount 102. Angled segment 124 extends angularly inward and upward from shelf 122 toward seat 42. Upper wall segment 126 extends generally vertically from an upper portion of angled segment 124, parallel to and offset inwardly from lower wall segment 120. Upper flange 128 extends generally parallel to the cab floor and outwardly away from an upper portion of the upper wall segment 126 away from the seat 42 and supports a lower surface of the armrest pad 58 to assist its support from armrest pad support bracket 64.

Still referring to FIG. 5, adjustment system 106 may include a track arrangement 130, shown here with a pair of tracks as a lower track 132 and an upper track 134. Each of the lower and upper tracks 132, 134 may be configured as a slide assembly, which may include roller bearings or other bearings to support cooperating components to glide or otherwise longitudinally extend and retract or advance and regress with respect to each other. Lower and upper tracks 132, 134 are shown inside and outside track members 136, 138 that have generally U-shaped cross-sectional profiles, each with a back wall 140 and a pair of spaced-apart side walls 142 that extend from the outer edges of the back wall 140. Inside track member 136 is arranged within a space or channel in the outside track member 136 so that the outside track member 136 fits over the top and covers the channel inside track member 136 with side walls 142 of outside track member 136 overlapping at least parts of the side walls 142 of the inside track member 134.

Still referring to FIG. 5, regardless of the particular configuration of lower and upper tracks 132, 134, as shown here, the track arrangement 130 may extend angularly upward from its back end to its front end. With this configuration of track arrangement 130, moving the armrest control center 44 in a forward or fore direction longitudinally advances the armrest control center 44 and simultaneously vertically raises the armrest control center 44. Moving the armrest control center 44 in a rearward or aft direction longitudinally regresses the armrest control center 44 and simultaneously vertically lowers the armrest control center 44.

Referring now to FIG. 6, a lock mechanism 150 allows for selectively fixing and releasing the armrest control center 44 for adjustment, as guided by adjustment system 106 (FIG. 5). Lock mechanism 150 is shown with latch 155 that is arranged below the armrest pad 58 and is accessible from the operator side of the armrest control center, toward the operator seat 42. Lock mechanism has an arm 157 that is moveable to selectively engage with the upper track 134 to lock the inside and outside track members 136, 138 to each other, which may include a pin, pad, or other engagement mechanism that is biased toward a locked potion. In this way, the default states of latch 155 locks the track arrangement 130 to provide the locked state of the armrest control center 44 and the armrest control center mount system 60 or its mount arrangement 62. Pulling the arm 157 to move it to an unlocked position momentarily releases the armrest control center 44 and the armrest control center mount system 60 or its mount arrangement 62 to its unlocked state to allow position adjustment of the armrest control center 44 and the I/O system 74.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

We claim:

1. An operator seat system for integrated control of agricultural machine functions, comprising:
   an operator seat mounted in an operator cab of an agricultural machine;
   an armrest control center movably mounted to the seat and being adjustable for adjusting and selectively fixable at a relative position with respect to the operator seat, wherein:
   the armrest control center defines,
      a locked state in which the armrest control center is fixed with respect to the operator seat; and an unlocked state in which the armrest control center can move with respect to the operator seat;
a console arranged at the armrest control center, with the console including an I/O (input/output) system that is configured to control multiple functional systems of the agricultural machine;
when the armrest control center is in the locked state, the I/O system is maintained in a constant position with respect to and moves in unison with the operator seat;
wherein:
the operator seat comprises:
a seat base,
a seat backrest that is pivotally attached to the seat base;
an armrest control center mount system that connects the armrest control center to the seat base and wherein the armrest control center mount system is configured to:
prevent movement of the armrest control center when the armrest control center is in the locked state; and
guide movement of the armrest control center when the armrest control center is in the unlocked state;
the armrest control center mount system further comprises:
a seat mount that is fixed with respect to the seat base;
an armrest control center mount that is fixed with respect to the armrest control center; and
at least one track arranged for guiding relative movement between the seat mount and the armrest control center mount when the armrest control center is in the unlocked state;
the at least one track includes:
an upper track arranged between overlapping upper segments of the seat mount and the armrest control center mount; and
a lower track arranged between overlapping lower segments of the seat mount and the armrest control center mount.

2. The operator seat system of claim 1, wherein each of the seat mount and the armrest control center mount defines a generally horizontal segment and wherein the upper track is arranged between the horizontal segments of the seat mount and the armrest control center mount.

3. The operator seat system of claim 2, wherein each of the seat mount and the armrest control center mount defines a generally vertical segment and wherein the lower track is arranged between the vertical segments of the seat mount and the armrest control center mount.

4. An operator seat system for integrated control of agricultural machine functions, comprising:
an operator seat mounted in an operator cab of an agricultural machine;
an armrest control center movably mounted to the seat and being adjustable and selectively fixable at a relative position with respect to the operator seat, wherein:
the armrest control center defines,
a locked state in which the armrest control center is fixed with respect to the operator seat; and
an unlocked state in which the armrest control center can move with respect to the operator seat;
a console arranged at the armrest control center, with the console including, an I/O (input/output) system that is configured to control multiple functional systems of the agricultural machine;
when the armrest control center is in the locked state, the I/O system is maintained in a constant position with respect to and moves in unison with the operator seat;

the agricultural machine is a self-propelled agricultural sprayer and the cab defines a cab entry side with a cab door for entering and exiting the cab of the self-propelled sprayer;
the operator seat defines:
a seat entry side arranged toward the cab entry side and that faces the cab door; and
a control side arranged away from the cab entry side;
the armrest control center is arranged at the control side of the operator seat;
an entry side armrest is supported at the seat entry side that is configured to selectively move for facilitating entry and exit from the operator seat;
the armrest control center is configured to selectively move for adjusting a position of the armrest control center relative to the operator seat and an operator in the operator seat;
the entry side armrest defines a left hand armrest that is configured to move by pivoting for facilitating entry and exit from the operator seat;
the armrest control center is configured to move to adjust at least one of a longitudinal position of the armrest control center and a vertical position of the armrest control center;
the armrest control center is configured to move to simultaneously adjust the longitudinal and vertical positions of the armrest control center; and
a track arrangement is between the armrest control center and the operator seat with a back end and a front end, the track arrangement extends angularly upward from the back end to the front end so that:
moving the armrest control center in a forward direction longitudinally advances the armrest control center and simultaneously vertically raises the armrest control center; and
moving the armrest control center in a rearward direction longitudinally regresses the armrest control center and simultaneously vertically lowers the armrest control center.

5. An operator seat system for integrated control of agricultural machine functions, comprising:
an operator seat mounted in an operator cab of an agricultural machine;
an armrest control center movably mounted to the seat and being adjustable and selectively fixable at a relative position with respect to the operator seat, wherein:
the armrest control center defines,
a locked state in which the armrest control center is fixed with respect to the operator seat; and
an unlocked state in which the armrest control center can move with respect to the operator seat;
a console arranged at the armrest control center, with the console including an I/O (input/output) system that is configured to control multiple functional systems of the agricultural machine; and
when the armrest control center is in the locked state, the I/O system is maintained in a constant position with respect to and moves in unison with the operator seat;
wherein the agricultural machine is a self-propelled agricultural sprayer with a sprayer boom and the I/O system includes at least two sets of I/O devices for controlling at least two functional groups of the agricultural sprayer, wherein the at least two functional groups include:
a boom control functional group for controlling movement of the sprayer boom;

a spray system functional group for controlling components that are configured for delivering liquid product from different locations on the sprayer boom;

an engine control system functional group for controlling operating characteristics of an engine of the agricultural sprayer;

a radio control system functional group for controlling a radio of the agricultural sprayer; and a drive control system functional group for controlling components that are configured for propelling the agricultural sprayer;

the console defines a main side console and the armrest control center further comprises, an armrest pad that is arranged closer to the operator seat than at least one of the at least two sets of I/O devices; and an armrest pad fingertip console that extends angularly down from and forward with respect to a front segment of the armrest pad, and wherein at least a third set of I/O devices for controlling at least a third functional group is arranged at the armrest pad fingertip console.

\* \* \* \* \*